Aug. 2, 1927.

G. MERLONETTI 1,638,000

MACARONI MACHINE

Filed Feb. 16. 1926

Inventor
Giulio Merlonetti
by his Attorneys
Howson & Howson

Aug. 2, 1927.
G. MERLONETTI
MACARONI MACHINE
Filed Feb. 16, 1926
1,638,000
3 Sheets-Sheet 2
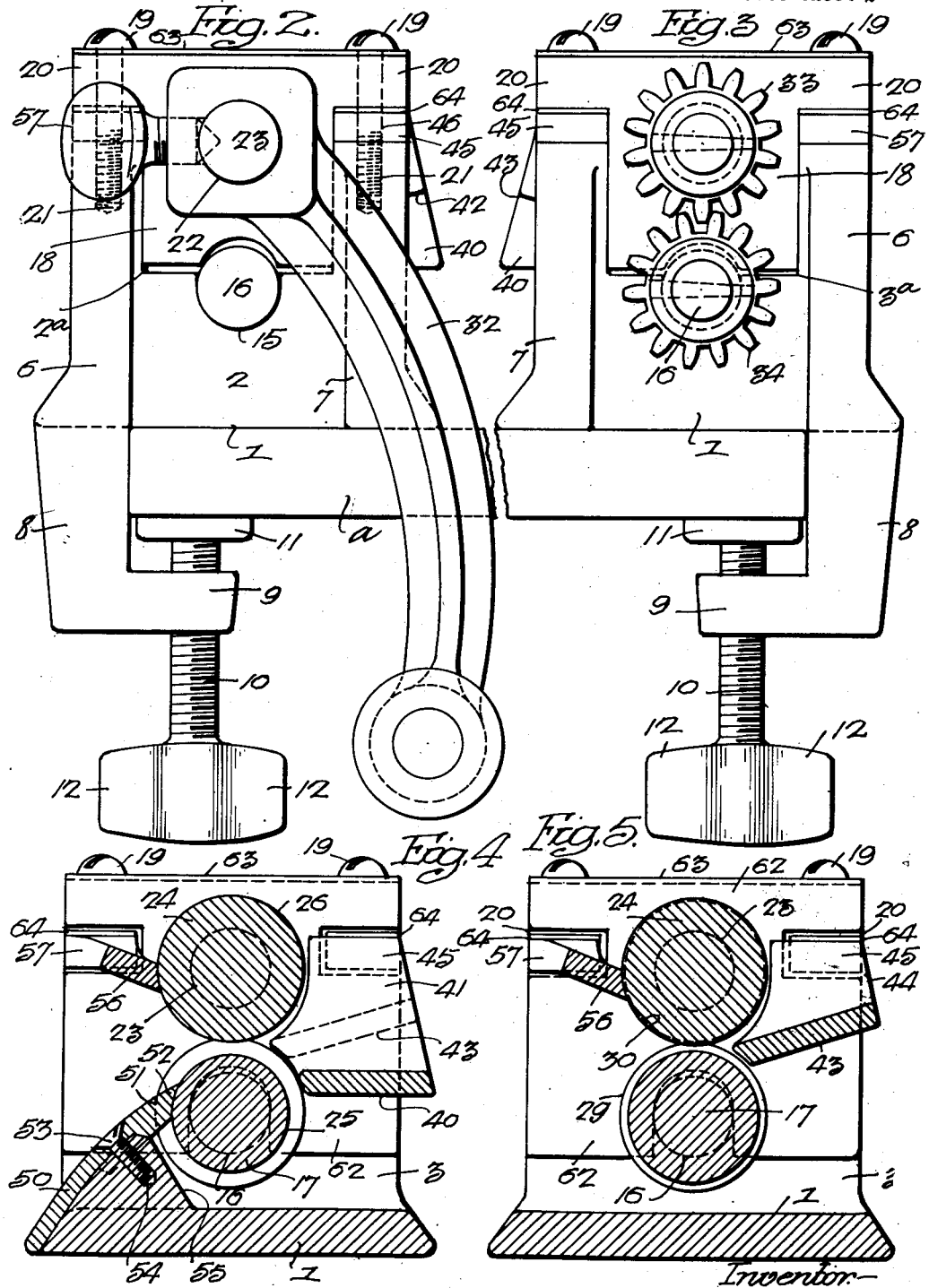
Inventor –
Giulio Merlonetti
by his Attorneys

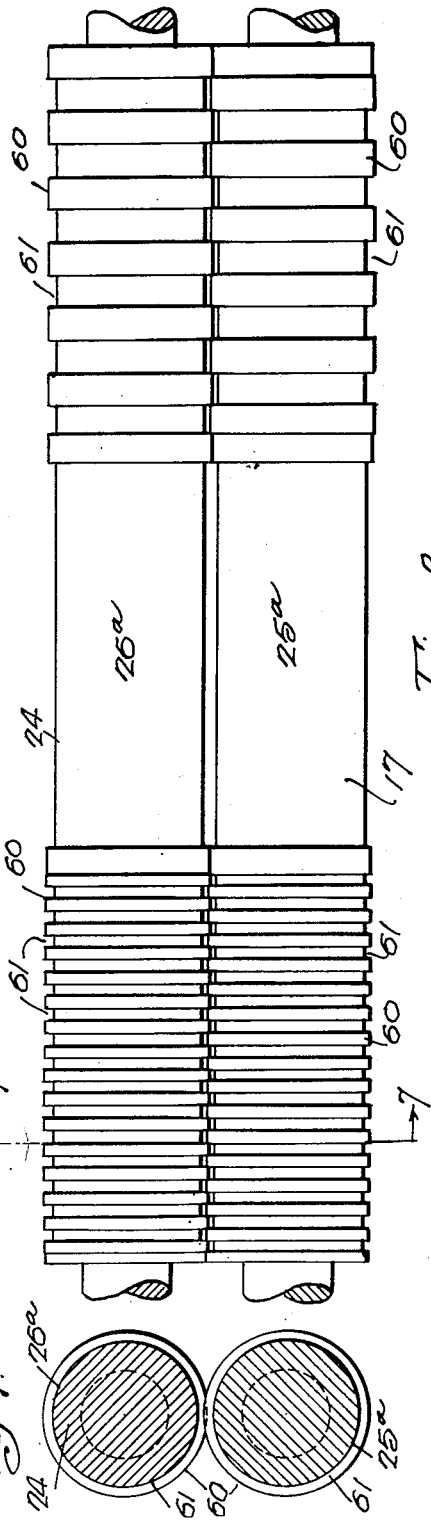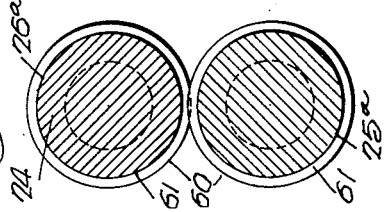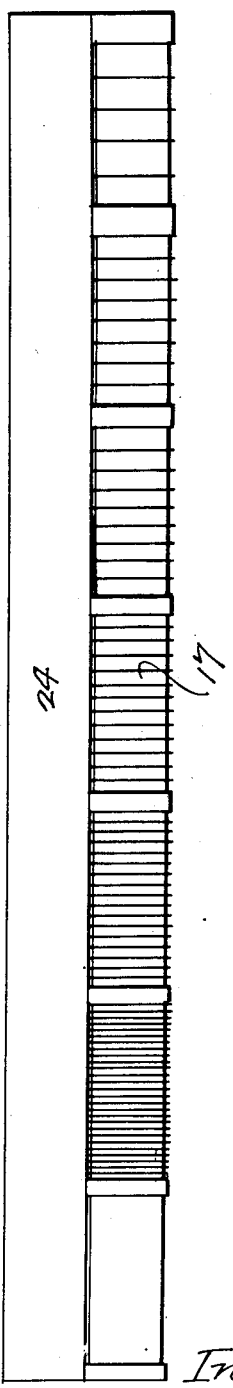

Patented Aug. 2, 1927.

1,638,000

UNITED STATES PATENT OFFICE.

GIULIO MERLONETTI, OF WEST CHESTER, PENNSYLVANIA.

MACARONI MACHINE.

Application filed February 16, 1926. Serial No. 88,647.

My invention relates to machines for forming batch dough into strips known as macaroni, and the principal object of my invention is to provide an inexpensive, efficient apparatus adapted for use in the household where comparatively small batches of dough are prepared at any single mixing.

The machine in its preferred form comprises a pair of co-operating rolls having plain portions adapted to roll the dough into thin sheets of convenient width, and a plurality of series of knife edges spaced to form macaroni strips of various widths from the pre-rolled sheet. The machine is constructed in such a manner that it may be clamped adjacent the edge of a table in a convenient manner, and the rolls thereof rotated by a simple crank secured to the shaft of one of said rolls.

Other advantages and details of my invention will be more fully disclosed hereinafter, as illustrated in the accompanying drawings, of which:

Figs. 2 and 3 are respectively right and left hand end elevations of the machine;

Fig. 4 is a sectional elevation taken along the line 4—4 of Fig. 1;

Fig. 5 is a sectional elevation taken along the line 5—5 of Fig. 1;

Fig. 6 is a longitudinal elevation of a pair of rolls forming a modification of the invention;

Fig. 7 is a sectional elevation on the line 7—7 of Fig. 6; and

Fig. 8 is a longitudinal elevation of a pair of rolls showing the knife blades grouped into a number of series, differently spaced throughout the length of the roll.

Figure 1:
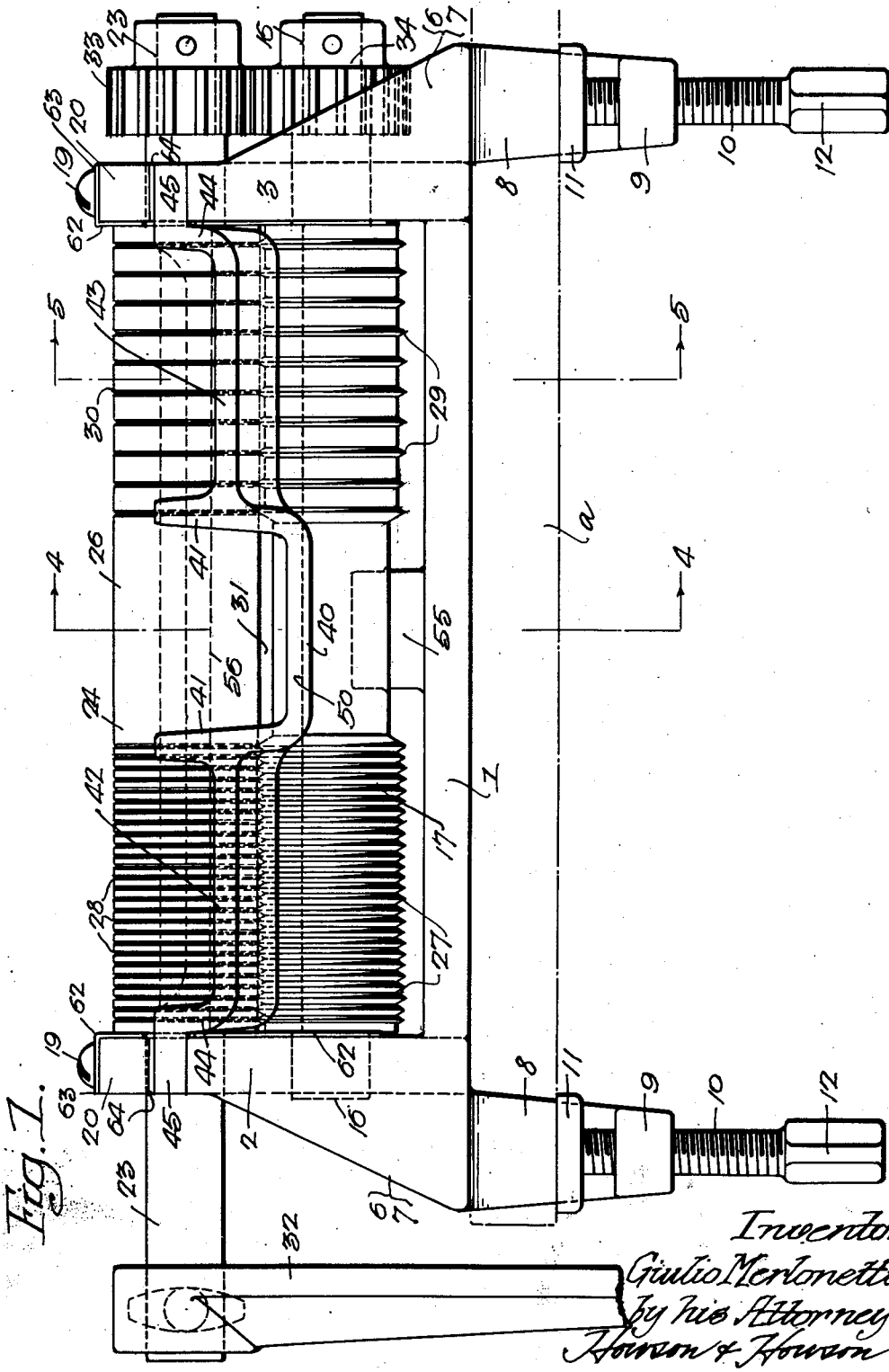
Figure 1 is a rear elevation of my improved macaroni machine.

As shown in Figs. 1, 2 and 3 my improved macaroni machine comprises a base 1 provided with vertically extending bearing standards 2 and 3 formed integral therewith, each of said standards being provided with angularly disposed ribs 6 and 7, extending outwardly therefrom. The base 1 is adapted to rest upon the upper surface of a table a, and the rib 6, in each instance, is extended downwardly and inwardly as indicated at 8 and 9 under the said table a.

The extension 9 of the rib 6 in each instance is tapped for the reception of a clamp screw 10 provided with a swivelled clamp plate 11 adapted to engage the under side of the table a. The screw 10 in each instance is provided with wings 12, 12 by which the screw may be turned to force the plate 11 into engagement with the table a, for the purpose of securing the machine to the table.

The bearing standards 2 and 3 are each provided with a substantially semi-circular cavity 15 adapted to form a journal for a shaft 16 extending from each end of a cutter roll 17. The shaft 16 is rotatably mounted in the journal cavity 15, being confined therein by means of removable bearing blocks 18, 18 adapted to enter rectangular openings 2ª, 3ª formed in the upper edge of the bearing standards 2 and 3 respectively. The bearing blocks 18 are secured to the standards 2 and 3 by means of screws 19 adapted to pass through apertures in extensions 20, 20 of the blocks 18, and into threaded openings 21 in the upper edge of the standards 2 and 3.

Each of the blocks 18 is provided with a circular journal cavity 22 in which one end of a shaft 23 is adapted to rotate. The said shaft ends 23 extend outwardly from each end of a press roll 24, positioned intermediate the bearing standards 2 and 3 and adapted to co-operatively engage the knife blades of the cutter roll 17.

The rolls 17 and 24 are respectively provided, at the middle thereof in the present instance, with plain portions 25 and 26 respectively. Between the plain portion 25 of the roll 17 and the bearing standard 2 is a series of closely spaced knife blades or cutting edges 27 which co-operate with shallow grooves 28 formed in the roll 24. Between the plain portion 25 of the roll 17 and the bearing standard 3, the said roll 17 is provided with a second series of knife blades 29 spaced apart a distance somewhat greater than that of the spacing of the blades 27. The blades 29 likewise co-operate with shallow grooves 30 formed in the roll 24.

The plain portion 25 of the roll 17 is somewhat reduced in diameter, thereby forming a space 31 between the plain portion 26 of the roll 24 and the plain portion 25 of the roll 17, through which a batch of previously mixed dough is passed by turning a crank 32 secured to the end of the shaft 23, adjacent the bearing standard 2.

Secured to the opposite end of the shaft 23, adjacent the standard 3, is a gear wheel 33 adapted to mesh with a second gear wheel 34 secured to the end of the shaft 16, whereby rotation of the roll 24 is transmitted to the roll 17 and the dough is forced through the space 31 in a flat sheet-like form.

As shown in Fig. 1, a feeding chute 40 is provided at one side of the machine and has vertically extending walls 41, 41 substantially aligned with the extreme edges of the plain portions 25 and 26 of the rolls 17 and 24, whereby the rough dough is fed to the space 31 between said rolls and limited to the plain portions of said rolls. Similar chutes 42 and 43 are provided adjacent the knife portions 27 and 29 of the roll 17. The vertical wall 41 in each instance forms the wall at one side of each of the chutes 42 and 43, a second vertical wall 44 being provided therefor adjacent the standards 2 and 3.

Each of the walls 44 is provided with an outwardly extending wing 45 adapted to rest on the top edge of the standards 2 and 3 respectively, between said top edge and the bottom surface of the projection 20 of each of the bearing blocks 18 and is adapted to be secured in place by means of the screw 19 passing through an aperture 46 formed in each of the wings 45.

At the side of the roll 17, opposite the feed chute 40—42—43, I provide a scraper plate 50, said scraper plate being provided with grooves 51 into which the blades 27 and 29 extend; and a projecting portion 52 adapted to engage the plain portion 25 of the roll 17. The plate 50 extends longitudinally of the machine intermediate the standards 2 and 3, being secured in place by a countersunk screw 53 passing through the plate 50 and into a threaded aperture 54 in a vertically extending lug 55 formed integral with the base 1.

The plate 50 is held in contact with the roll 17 for the purpose of scraping the surface of said roll and keeping it free of any dough that may have a tendency to adhere thereto; and for the same purpose the roll 24 is provided with a scraper plate 56, extending the full length thereof and having end wings 57 lying on the top edge of the standards 2 and 3, below the projections 20 of the bearing blocks 18, 18, being secured in position by means of the screws 19, in a manner similar to the feed chute 40—42—43 and occupying a position at the opposite side of the roll therefrom.

In operation the batch of dough is placed in the feeding chute 40 and passes into the space 31 between the rolls 17 and 24; and upon turning the crank 32 the rolls 17 and 24 are simultaneously rotated, the dough passing from between the said rolls in the form of a sheet.

The sheet of dough, as it comes from the rolls 17 and 24, is taken therefrom and placed in either of the chutes 42 or 43, depending upon the width of macaroni strip to be formed, and the rotation of the rolls is repeated. The sheet being passed between the rolls 17 and 24 is cut into strips by the knife blades 27 or 29 co-operating with the shallow grooves 28 or 30 of the roll 24, as the case may be.

In Fig. 6, I have shown a pair of rolls having central plain portions 25$^a$ and 26$^a$, the adjacent cutting portions being provided with alternating annular ribs 60 and grooves 61, formed between the successive annular ribs. When placed in the machine, the annular ribs of the lower roll are positioned opposite the grooves of the upper rolls and when the previously rolled sheet of dough is passed between these rolls it is cut into strips equal to the width of the annular ribs and the grooves. The edges of the annular ribs of one roll co-operate with the side walls of the grooves of the opposite roll, in the form of shears.

In Fig. 8, I have shown a pair of rolls by which macaroni may be cut in various width strips, it being understood that my invention is not limited to the cutting of any particular width as the knife blades of the cutting roll may be spaced in any desired manner, the shallow grooves in the press roll being spaced in a like manner to cut the sheet of previously rolled dough into macaroni strips of the desired width, or the grooves may be eliminated as shown in said figure.

In order to prevent the dough being forced longitudinally outward from between the ends of the rolls 17 and 24, I provide guide plates 62, between the ends of the rolls and the inside of the standards 2 and 3 respectively. The guide plates 62 extend from the top edge of the bearing blocks 18 to a point well below the center of the shaft 16, being provided with suitable apertures for the accommodation of the shafts 16 and 23, and having a flange 63 extending across the top edge of each of said blocks 18, apertures being provided in said flanges through which the screws 19 pass, to secure the said guide plates in position.

The guide plates 62 provide a solid wall construction at the point of contact between the peripheries of the rolls 17 and 24, lying in close contact with the ends of said rolls. The dough, in passing between the rolls, is confined within the limits of the rolls thereby preventing any of the dough from accumulating around the standards 2 and 3.

In order to vary the thickness of the sheet of dough the blocks 18, 18, with the shaft 23 and the roll 24 are adapted to be adjusted vertically, and for this purpose shim plates 64 are provided between the lower sides of the projections 20, of the blocks 18, and the upper face of the wings 46 and 57. Apertures are provided in the shim plates through which the screws 19 pass, for the purpose of confining the said wings, the shim plates and the projections of the blocks rigidly to the bearing standards 2 and 3. The block 18 in each instance is slightly shorter than the depth of the rectangular opening in the standards 2 and 3, and is also provided with a semi-circular cavity for the actuation of the shaft 16 when the block is moved downward. It will be understood that the shim plates 64 may be removed and either thicker or thinner plates substituted for the purpose of adjusting the relative positions of the rolls 17 and 24.

I claim:

1. In a macaroni machine, the combination of a pair of co-operating rolls divided respectively into a sheet rolling section and a strip cutting section.

2. In a macaroni machine, the combination of a pair of co-operating rolls divided respectively into a sheet rolling section and a plurality of strip cutting sections, each cutting section being adapted to cut a sheet into strips of a width different from that of each of the other cutting sections.

3. In a macaroni machine, the combination of a pair of co-operating rolls divided respectively into a sheet rolling section positioned at the center of the roll, and a strip cutting section at either side of said sheet rolling section, each strip cutting section being adapted to cut a strip of a different width from that of the other cutting section.

4. In a macaroni machine, the combination of a pair of co-operating rolls divided respectively into a sheet rolling section and a plurality of strip cutting sections, each section being adapted to cut a sheet into strips of a width different from that of each of the other cutting sections, and a feeding chute divided into sections corresponding to and aligned with the sheet rolling section, and each of the cutting sections.

5. In a macaroni machine, the combination of a frame; bearings on said frame; a pair of shafts rotatably mounted in said bearings; a press roll secured to one of said shafts; knife blades on the other of said shafts; grooves in said press roll co-operatively aligned with said knife blades; a plain portion on said press roll; and a plain roll on said second shaft co-operatively aligned with the plain portion of said press roll.

6. In a macaroni machine, the combination of a press roll; a shaft parallel with said press roll; a plain roll on said shaft; and a plurality of series of differently spaced knife blades on said shaft and engaging said press roll, for the purpose of rolling rough dough into flat sheets and cutting said sheets into various width strips.

GIULIO MERLONETTI.